Aug. 3, 1954   J. ROSAN   2,685,320
CLINCH BOLT AND NUT
Filed Aug. 15, 1949

JOSEPH ROSAN
INVENTOR.

BY *Farrel J. Tilly*
ATTORNEY

Patented Aug. 3, 1954

2,685,320

UNITED STATES PATENT OFFICE 2,685,320

CLINCH BOLT AND NUT

Joseph Rosan, Balboa Island, Calif.

Application August 15, 1949, Serial No. 110,290

3 Claims. (Cl. 151—41.73)

The present invention deals generally with fastening devices in the nature of clinch bolts and nuts, particularly those designed to be installed in a flush head position, with the bolt or nut head provided with self-locking means for clinching the head to the work.

In the assembly of many machine and industrial components, it is convenient to install a bolt in a semi-permanent position in one component, so that another component fastened to the first by the said bolt can be disassembled simply by removing the usual nut, the bolt itself remaining fixed or embedded in the first component. This practice prevents the bolt from falling out of its bolt hole, and greatly facilitates reassembly, since it is held rigidly in position, ready to receive the disassembled part and the fastening nut. Frequently, the bolt must be entered from a relatively inaccessible position, and it is of great importance in servicing operations that it not become displaced. The same considerations apply to the case of a nut, and the invention applies to either bolt head or nut head, as will appear.

A primary object of the invention is to provide a clinch bolt or nut having improved means for embedding and anchoring the bolt or nut head in the work.

A further object is the provision of an improved clinch head bolt or nut capable of being disassembled from the work when required, as by reason of necessary replacement owing to a crossed or stripped thread or the like, and which can readily be replaced by a new bolt or nut which will self-lock with the work with as much security as did the first.

The invention, as well as various additional objects thereof, and its various features and advantages, will be best understood from the ensuing description of a present preferred illustrative embodiment thereof, reference for this purpose being directed to the accompanying drawings, wherein.

Figure 3:
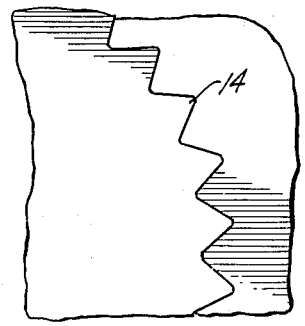
Figure 3 is a fragmentary plan view taken in accordance with arrows 3—3 of Figure 2.

In the drawings numeral 10 designates generally the cylindrical shank of a bolt in accordance with the invention, said shank having a usual screw threaded section 11 adjacent one end, and having at its other or outer end enlarged rounded head or body 12. This head 12 has at the top an enlarged flange portion 13 formed around its periphery with a band of longitudinally or axially directed locking formations, preferably in the form of serrations 14 of substantially triangular cross-section, as illustrated in Figure 3. The inner ends of the serrations 14 may be regarded as formed approximately at right angles to the insert, though they are preferably under-cut at a slight cutting angle or rake, as indicated at 15, so as to increase the effectiveness of the serration as cutting or broaching elements.

Figure 1:
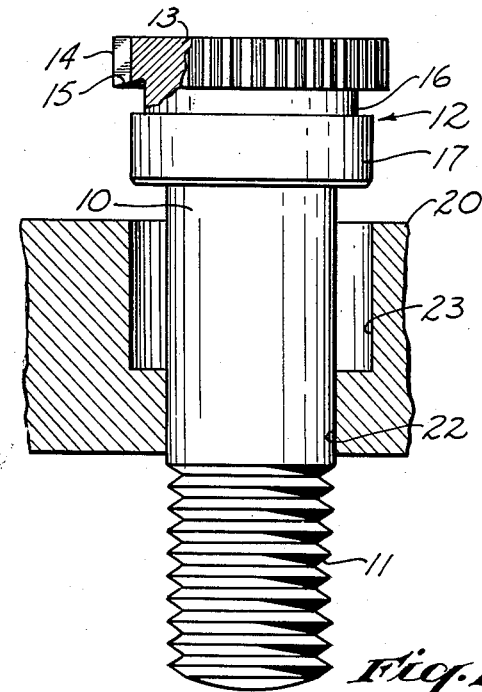
Figure 1 is a view showing the clinch bolt of the invention in elevation, fragmentarily broken away, and passing through a mounting part shown in medial section.
Figure 2:
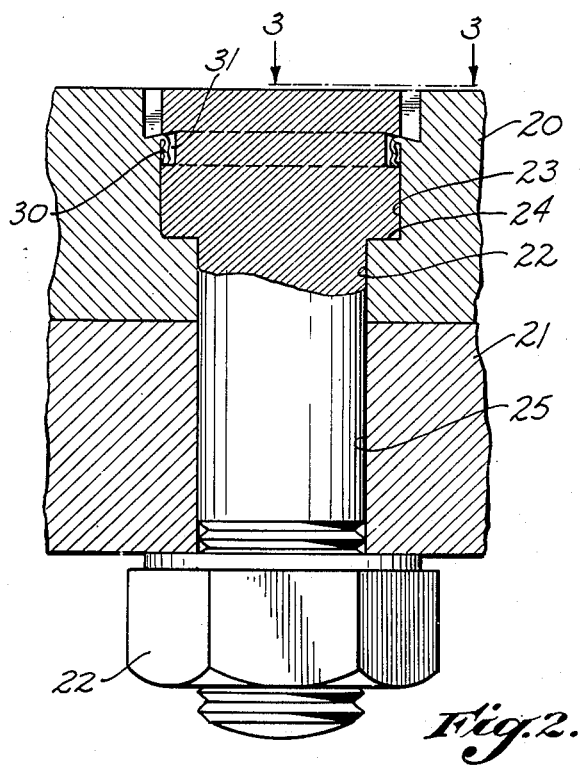
Figure 2 shows the bolt of the invention in elevation, with the head thereof and the mounting and mounted parts in medial section.

Below the serrated flange part 13, head 12 has a reduced intermediate neck portion 16, of a diameter somewhat less than the root diameter of the serrations 14, and below reduced section 16, the head includes a third portion in the form of a cylindrical disk 17 of a diameter approximating, or at least as great as, the diameter of the root circle of the serrations 14. In Figures 1 and 2, the bolt as thus described is shown as embedded and self-locked within a mounting body or machine part 20, against which the bolt secures a mounted part 21, a conventional nut 22 being used on the threaded end of the bolt to secure the part 21 to the part 20. To prepare the part 20 for reception of the clinch bolt, it is formed with a bore 22 adapted to receive bolt shank 10, and with a counterbore 23 adapted to receive bolt head 12, the depth of the counterbore 23 being equal to the thickness of head 12, so that the latter will be received in a flush head position when the head of the bolt is seated home against the annular shoulder 24 afforded at the juncture of counterbore 23 with bore 22. The part 21 is formed with bore 25 for reception of the shank 10 of the bolt, and the bolt is long enough that, when seated in the position shown in Figure 2, its threaded end portion projects sufficiently beyond part 21 to receive the nut 22.

The counterbore 23 and the flange portion 17 on the bolt head are of such relative diameter that the part 17 is received in the counterbore with a relatively tight fit. At the same time, the root circle of the serrations 14 is of no greater diameter than that of the counterbore 23, while substantially all or a major portion of the serrations 14 project outside the wall of the counterbore 23, or in other words overhang the wall portion surrounding the counterbore, as clearly appears in Figure 1. The circle formed by the crests of the serrations is thus of greater diameter than the counterbore 27, resulting in the necessary overhang of the serrations as described.

In the assembly of the device, the bolt is entered in the bore 22 and passed downwardly through the position shown in Figure 1 until the flange part 17 of the head is received in counterbore 23 and the undersides or lower end portions of the serrations 14 engage the member 20 around counterbore 23. In the latter part of this travel, the flange portion 17 slides inside the counterbore 23, serving as a pilot to guide the bolt accurately into position. The serrations having engaged member 20 as a result of this movement, the bolt head is then further pressed or hammered downwardly to the position of Figure 2, the serrations 14 cutting or broaching their way through the parent material of the body 20 during this latter phase of the installation. It is of course necessary that the bolt head be of a harder material than the material of the member 20 to permit this broaching action. Consequently, in the usual situation, the member 20 will be commonly an aluminum alloy or the like, while the bolt will be typically an alloy steel. No limitation to these materials is of course to be implied, since the only requirement is that the bolt head be of sufficiently harder material than the material of the part 20 to permit the cutting action described.

In the course of the downward travel of the serrations 14 within the material of the body part 20, the bolt is accurately guided by the sliding engagement of pilot part 17 within counterbore 23, and the broaching serrations 14 actually cut chips from the body 20, as indicated at 30 in Figure 2, these chips being received in the annular channel 31 afforded by the necked down intermediate head portion 16 and being prevented from reaching the shoulder of the counterbore 24 by said pilot part, which moves along the counterbore in advance of the serrations as the bolt is driven into place. It is necessary to provide this clearance space for the reception of the chips, since otherwise a clean and effective installation will not be achieved.

Installed as described, the head of the bolt is tightly self-locked or anchored within the material of the body 20, and it will retain its position indefinitely until positively driven out of place by intentional hammering on the end of the bolt. The completion of the assembly, which amounts simply to engaging the part 21 with the shank of the bolt, and the turning on of the nut 22, is self-evident. And it will be equally clear that removal of the nut 22 and the part 21 will leave the bolt locked firmly in position in the part 20. If however, the threads on the shank of the bolt should become mutilated or for any other reason it should be desired to remove the bolt from the part 20, this can readily be accomplished by tapping it on its inner end. When at a subsequent time it is then desired to install a new bolt in the place formerly occupied by the removed one, the new bolt is installed as before, with the only difference being that not so much chip will be taken as in the first instance. However, owing to inevitable eccentricities in manufacture, the serrated head portion of the new bolt will again fit tightly in the previously broached passageway. In the event that any additional security should be desired, it is always possible to provide a bolt head with slightly oversized serrations for use on second or replacement installations.

Figure 4:
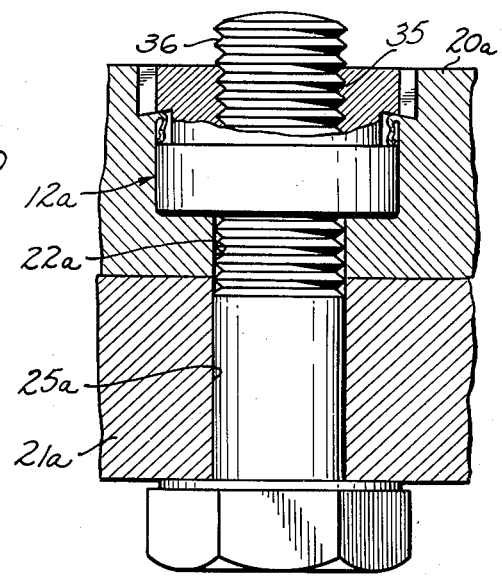
Figure 4 is a view showing a nut in accordance with the invention, the nut appearing partly in the elevation and partly in medial section, with a bolt assembled therewith appearing in elevation, and the mounting and mounted parts appearing in section.

Figure 4 shows the alternative applications of the invention to a nut head rather than to a bolt. In this instance, the parts 20 and 21, with their bores and counterbores, are exactly similar to those previously described, and are identified by the same reference numerals with the suffix *a* added. The nut head, indicated by numeral 12*a*, is exactly similar to the bolt head of the embodiment of Figures 1 and 2, with the exception that it is formed with a screwthreaded bore 35 in place of the shank of Figures 1 and 2. It will be readily understood that the nut head 12*a* is installed in a manner exactly similar to the installation of the bolt head, and that when installed in the part 20*a*, it may be engaged by the threaded shank 36 of a conventional bolt to secure the part 21*a* to the part 20*a*.

It should be observed that the pilot part of the bolt head or nut is restrained against axial outward movement by the chips 30 which remain attached to the body of the material. Thus the bolt or nut, as the case may be, tends to remain in place when the other member is unscrewed; however, the chips may be readily sheared if it is desirable to remove the nut or bolt.

Certain illustrative forms of the invention have now been described, but it will be understood that these are for illustrative purposes only and that various changes in design, structure and arrangement may be made without departing from the spirit and scope of the invention.

I claim:

1. A drive-type fastening means for installation in a bored and counterbored body, comprising the combination of: a head having a thickness equal to the depth of said counterbore and being receivable in the counterbore and having, in axial succession, an axially serrated substantially non-deformable flange, a peripheral chip-receiving channel, and a pilot cylinder; and a threaded shank connected to said head and extending axially from said pilot cylinder, said shank being slidable receivable in the bore in said body, and the end of said pilot cylinder being flat and adapted to seat on the annular shoulder formed at the juncture of the bore and counterbore in said body; the circle formed by the crests of said serrations being of greater diameter than said counterbore and the root circle of said serrations being of no greater diameter than said counterbore, the lower ends of said serrations being adapted to engage and broach their way into the wall of said body surrounding said counterbore when said head is driven axially into the latter, said chip receiving channel being of less diameter than said counterbore to form a clearance space for the reception of chips, and said pilot cylinder being of a diameter at least as great as the root diameter of said serrations, and being dimensioned for a close sliding fit in said counterbore, whereby the pilot cylinder moves along the counterbore ahead of the serrations as said serrations broach their way into the wall of said body and prevents the entry of chips into the region between said flat end of said pilot cylinder and the shoulder of said counterbore.

2. The subject matter of claim 1, wherein said shank is intergral with said head.

3. The subject matter of claim 1, wherein said head comprises a nut with a threaded bore extending axially therethrough, and said shank comprises a bolt shank threaded into said bore.

References Cited in the file of this patent

UNITED STATES PATENTS

| Number | Name | Date |
|---|---|---|
| 813,093 | Henn | Feb. 20, 1906 |
| 1,373,645 | Bandoly | Apr. 5, 1921 |
| 1,938,424 | Hart | Dec. 5, 1933 |
| 1,996,795 | Dodge | Apr. 9, 1935 |
| 2,372,485 | Griffin | Mar. 27, 1945 |
| 2,400,318 | Rosan | May 14, 1946 |
| 2,427,994 | Merrill | Sept. 23, 1947 |
| 2,444,145 | Rosan | June 29, 1948 |
| 2,510,076 | Cockrell | June 6, 1950 |

FOREIGN PATENTS

| Number | Country | Date |
|---|---|---|
| 133,093 | Great Britain | Oct. 9, 1919 |